(12) United States Patent
Hankin

(10) Patent No.: US 7,895,247 B2
(45) Date of Patent: Feb. 22, 2011

(54) TRACKING SPACE USAGE IN A DATABASE

(75) Inventor: Keith Alan Hankin, Palo Alto, CA (US)

(73) Assignee: Oracle International Corporation, Redwood Shores, CA (US)

(*) Notice: Subject to any disclaimer, the term of this patent is extended or adjusted under 35 U.S.C. 154(b) by 1004 days.

(21) Appl. No.: 10/697,070

(22) Filed: Oct. 29, 2003

(65) Prior Publication Data

US 2005/0097130 A1    May 5, 2005

(51) Int. Cl.
G06F 17/30    (2006.01)
(52) U.S. Cl. .................................... 707/812
(58) Field of Classification Search ............... 707/102, 707/609, 999.2, 802, 812
See application file for complete search history.

(56) References Cited

U.S. PATENT DOCUMENTS

| | | | |
|---|---|---|---|
| 4,680,859 A | 7/1987 | Johnson | |
| 4,935,750 A | 6/1990 | Hawkins | |
| 5,435,961 A | 7/1995 | Micciche | |
| 5,450,113 A | 9/1995 | Childers et al. | |
| 5,478,700 A | 12/1995 | Gaynes et al. | |
| 5,515,089 A | 5/1996 | Herko et al. | |
| 5,538,586 A | 7/1996 | Swanson et al. | |
| 5,539,153 A | 7/1996 | Schwiebert et al. | |
| 5,627,108 A | 5/1997 | Alibocus et al. | |
| 5,736,998 A | 4/1998 | Caren et al. | |
| 5,807,606 A | 9/1998 | Mould et al. | |
| 5,905,513 A | 5/1999 | Brandon et al. | |
| 6,035,306 A * | 3/2000 | Lowenthal et al. ............ 1/1 |
| 6,076,912 A | 6/2000 | Murthy | |

(Continued)

FOREIGN PATENT DOCUMENTS

EP    0518574 A2    12/1992

(Continued)

OTHER PUBLICATIONS

International Searching Authority, "Notification of Transmittal of the International Search Report and the Written Opinion of the International Searching Authority, or the Declaration," PCT/US2004/036122, dated Jan. 5, 2006, 13 pages.

(Continued)

*Primary Examiner*—Angela M Lie
(74) *Attorney, Agent, or Firm*—Hickman Palermo Truong & Becker LLP

(57) ABSTRACT

A method and apparatus for determining the usage of space in a database is provided. A first set of space usage data that reflects the amount of free space associated with one or more tablespaces of a database is stored at a first database server. A second set of space usage data is retrieved from one or more other database servers. The first set of space usage data and the second set of space usage data are both updated based on changes made to the database by the particular database server storing the space usage data. The first set of space usage data is updated at the first database server with the second set of space usage data. The first database server may evaluate the usage of space in the database based on the updated first set of space usage data.

24 Claims, 4 Drawing Sheets

U.S. PATENT DOCUMENTS

| | | | |
|---|---|---|---|
| 6,098,257 | A | 8/2000 | Koido et al. |
| 6,244,696 | B1 | 6/2001 | Tran et al. |
| 6,267,472 | B1 | 7/2001 | Maher et al. |
| 6,290,340 | B1 | 9/2001 | Kitahara et al. |
| 6,328,423 | B1 | 12/2001 | Wong et al. |
| 6,361,152 | B1 | 3/2002 | Fujisawa |
| 6,371,017 | B1 | 4/2002 | Yamazaki et al. |
| 6,386,434 | B1 | 5/2002 | Wong |
| 6,495,199 | B1 | 12/2002 | Kaiser et al. |
| 6,508,170 | B2 | 1/2003 | Katsuoka et al. |
| 6,879,995 | B1 * | 4/2005 | Chinta et al. ............ 709/204 |
| 2001/0015744 | A1 | 8/2001 | Feinn et al. |
| 2001/0043252 | A1 | 11/2001 | Feder et al. |
| 2002/0051042 | A1 | 5/2002 | Takagi et al. |
| 2002/0105562 | A1 | 8/2002 | Miyagawa et al. |
| 2002/0128340 | A1 | 9/2002 | Young et al. |
| 2002/0185482 | A1 | 12/2002 | Cobb et al. |
| 2003/0115244 | A1 | 6/2003 | Molloy et al. |
| 2003/0191909 | A1 | 10/2003 | Asano et al. |
| 2004/0019662 | A1 * | 1/2004 | Viswanath et al. ......... 709/220 |
| 2004/0089171 | A1 | 5/2004 | Jiang et al. |
| 2004/0158573 | A1 * | 8/2004 | Bradley et al. ............ 707/102 |
| 2005/0066134 | A1 * | 3/2005 | Tormasov et al. ........... 711/151 |

FOREIGN PATENT DOCUMENTS

WO    WO 03/047217 A2    6/2003

OTHER PUBLICATIONS

Current Claims, PCT/US2004/036122, dated Jan. 24, 2006, 4 pages.
Oracle Corporation, "Oracle9i—Database Concepts, Release 2 (9.2)," part No. A96524-01, Mar. 2002, XP002360772, 70 pages.
Oracle Corporation, "Oracle9i—Database Performance Tuning Guide and Reference Release 2 (9.2)," Part No. A96533-01, Mar. 2002, XP002360773, 52 pages.
Oracle Corporation, "The Self-Managing Database: Proactive Space & Schema Object Management," An Oracle White Paper, Nov. 2003, XP002360725, pp. 3-20.
European Patent Office, "Communication Pursuant to Article 96(2) EPC," App. No. 04796828.4, received Oct. 27, 2006, 3 pages.
Claims, EP App. No. 04796828.4, 3 pages.
International Preliminary Examining Authority, "Notification of Transmittal of the International Preliminary Examination Report," PCT/US2004/036122, dated Jun. 9, 2006, 7 pages.
Claims, PCT/US2004/036122, 3 pages (attached).

* cited by examiner

DATABASE SERVER

SPACE USAGE DATA

| TABLESPACE NUMBER | DATA FILE NUMBER | NUMBER OF ALLOCATED DATA BLOCKS | SYSTEM CHANGE NUMBER (SCN) |
|---|---|---|---|
| 1 | 1 | 40 | 230 |
| 1 | 2 | 20 | 231 |
| 2 | 5 | 30 | 232 |
| 3 | 10 | 10 | 240 |

TRACKING SPACE USAGE IN A DATABASE

FIELD OF THE INVENTION

The present invention relates to determining the usage of space in a database.

BACKGROUND OF THE INVENTION

The usable data stored within a database may be logically stored in one or more tablespaces and may be physically stored in one or more data files associated with a particular tablespace. A tablespace is a set of one or more data files that are used to store data for a database object, such as a table or table partition. Database metadata defines tablespaces and the database objects for which a tablespace stores data. A database administrator may use a tablespace to do one or more of the following: control disk space allocation for data stored in the database, assign specific space quotas for database users, control the availability of data by taking individual tablespaces online or offline, perform partial database backup or recovery operations, and allocate data storage access devices to improve performance.

A data file (or simply "file") is associated with a particular tablespace and physically stores data in the tablespace. A data file is composed of one or more logical storage units. For example, a data file may be composed of one or more extents. Each extent is a logical grouping of one or more data blocks. A data block is an allocation of contiguous storage space within data files that is used to store database data. The size of each data block in a tablespace is the same. A typically size of a data block is 2K, 4K, 8K, or 16K.

Storage space within a data file that is not allocated to a database object is free space. The number of extents that are not allocated to any object is stored in the first block of a file. By aggregating the amount of free space across all data files in a tablespace, one can determine how much free space is available in the tablespace.

Tablespaces can have a fixed size. When a database administrator creates a new tablespace, the database administrator may not know how much data will be stored within the new tablespace or the growth rate for data stored within the new tablespace; nevertheless, the database administrator chooses a fixed size for the tablespace upon its creation.

When the amount of data stored within a tablespace exceeds a certain size or threshold, it is advantageous to increase the size of the tablespace to ensure that the tablespace does not run out of space. Additionally, providing that a certain minimum level of free space exists in the tablespace ensures that storing data in the tablespace will be performed with optimal performance.

Currently, the amount of free space available in a database is determined by a database server by periodically examining the database to determine: (a) how many tablespaces are in the database, (b) how many data files are in each tablespace in the database, and (c) how many data blocks are in each data file in each tablespace in the database. A data file contains information about the number of allocated data blocks within the data file. The free space for each data file in each tablespace in the database is aggregated to determine if the amount of free space in a tablespace in the database is below a specified threshold. This technique of determining the amount of free space in a database shall be referred to hereafter as "polling" the database.

If the amount of free space in a tablespace in the database is below a specified threshold, then the database server may raise an alert to the database administrator. Upon receiving the alert, the database administrator may increase the size of the tablespace to increase the amount of free space in that tablespace.

This approach undesirably requires a significant amount of time and computing resources to determine the amount of free space within a tablespace. For example, if a tablespace contained 100 data files, but only 10 data files are associated with data blocks that have either been allocated or deallocated since the last time the amount of free space in the tablespace was determined, then the above approach would still require that each of the 100 data files be consulted to determine the free space in the tablespace, even though 90 of the data files were unchanged since the last time the amount of free space was determined in the tablespace.

Accordingly, there is an unaddressed need in the art to determine the usage of space in a database without incurring the problems associated with prior approaches.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The present invention is illustrated by way of example, and not by way of limitation, in the figures of the accompanying drawings and in which like reference numerals refer to similar elements and in which:

FIG. 3 is a pictorial representation of stored space usage data according to an embodiment of the invention.

DETAILED DESCRIPTION OF THE INVENTION

A method and apparatus for determining the usage of space in a database is described. In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Architecture Overview

Figure 1:
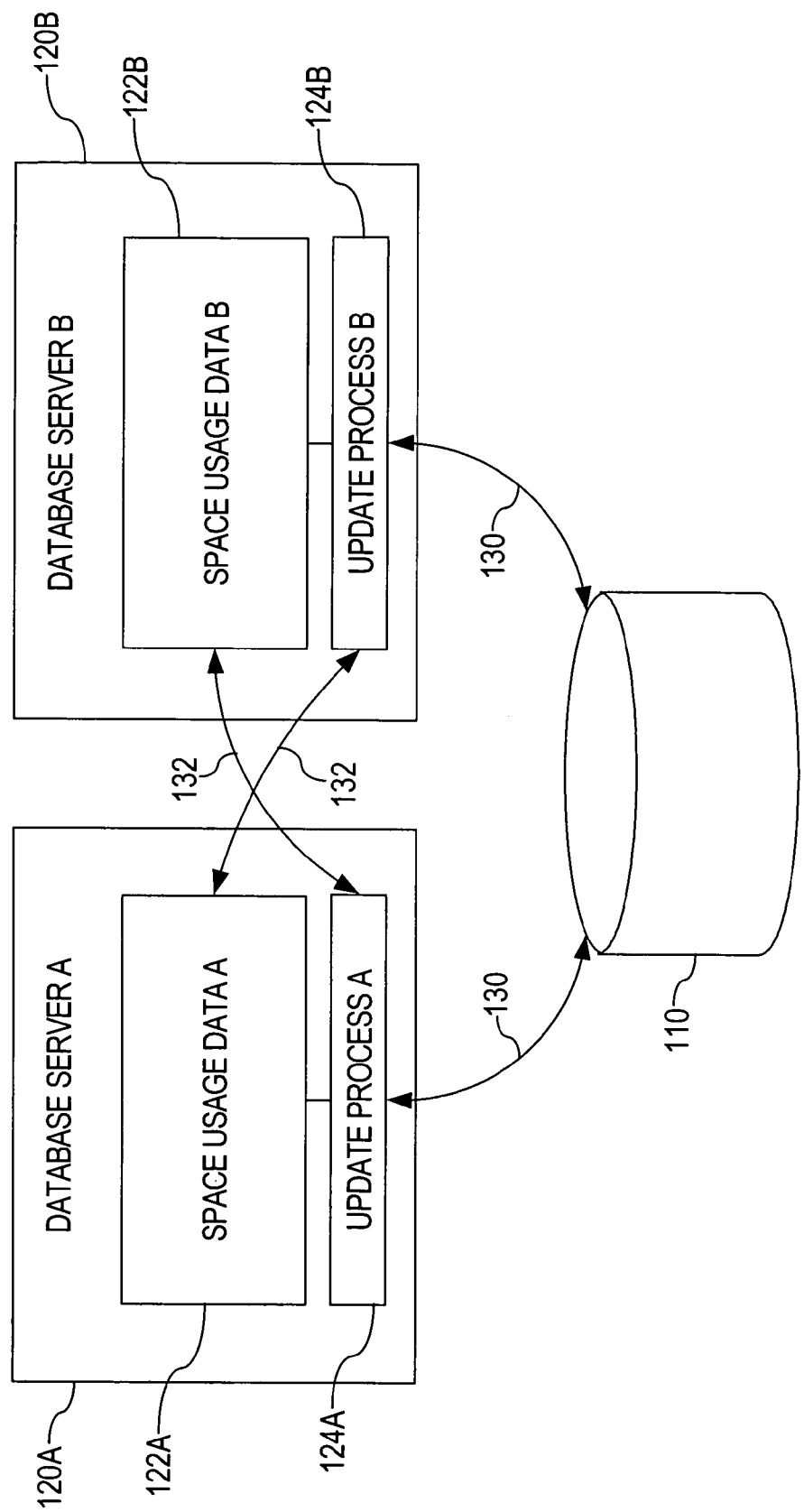
FIG. 1 is a block network diagram illustrating a space usage system according to an embodiment of the invention.

FIG. 1 is a block network diagram illustrating a database management system 100 according to an embodiment of the invention. The database management system 100 may be used to accurately determine the usage of space of a database without examining each data file within each tablespace in the database. Additionally, as described herein, other benefits may be achieved using database management system 100. The database management system 100 of FIG. 1 includes database 110, database servers 120A and 120B, and communications links 130 and 132.

A database, such as database 110, is a computerized mechanism for durably storing electronic information. Nonlimiting, illustrative examples of a database include a relational database, an object oriented database, a multidimensional database, a database in a distributed cluster of computers, and a database in a grid of server blades. A distributed cluster of database servers is explained in further detail in U.S. Pat. No. 6,353,836, which is incorporated herein by reference. A grid on which a set of database servers is running is explained in further detail in U.S. Provisional Patent Application Ser. No. 60/500,050, which is incorporated herein by reference.

A database server, such as database servers 120A and 120B, is a combination of a set of integrated software components and an allocation of computational resources, such as memory and processes for executing the set of integrated software components on a processor, where the combination of software and computational resources are used for managing a database. Among other functions of database management, a database server governs and facilitates access to a database, and processes requests by database clients to access the database. The clients of a database server may include other database servers. While only two database servers, namely database server 120A and 120B, are depicted in FIG. 1, any number of database servers may be operatively connected to database 110.

A database server, e.g. database server 120A, may include space usage data and an update process. Space usage data, such as space usage data 122A and 122B, refers to data that reflects the amount of free space associated with a database. In an embodiment, space usage data is updated based on changes made to the database by the database server on which the space usage data is stored. Space usage data will be discussed in further detail below in the section entitled "DETERMINING THE USAGE OF SPACE IN A DATABASE."

An update process, such as update process 124A and 124B, as used herein refers to a set of one or more software components that are capable of (a) retrieving space usage data from database 110 and one or more database servers, and (b) updating the space usage data stored at the database server where the update process is located with the retrieved space usage data. The operation of update processes will be discussed in further detail below in the section entitled "DETERMINING THE USAGE OF SPACE IN A DATABASE."

Communications link 130 may be implemented by any medium or mechanism that provides for the exchange of data between database 110 and a database server, e.g., database server 120A or database server 120B. Communications link 132 may be implemented by any medium or mechanism that provides for the exchange of data between database servers, e.g., between database server 120A and database server 120B. Examples of communications links 130 and 132 include, without limitation, a network such as a Local Area Network (LAN), Wide Area Network (WAN), Ethernet or the Internet, or one or more terrestrial, satellite or wireless links.

Functional Overview

According to an embodiment, the usage of space within one or more tablespaces within a database may be determined using embodiments of the invention. A first set of space usage data is stored at a first database server. In an embodiment, the first set of space usage data reflects the amount of free space associated with one or more tablespaces within the database. In an embodiment, the first set of space usage data is updated based on changes made to the database by the first database server. For example, the first set of space usage data may be updated based on the number of data blocks that are allocated and deallocated to database objects.

In an embodiment, the first set of space usage data may be obtained by examining the database and determining the usage of space within each tablespace of the database by known techniques.

Next, a second set of space usage data is retrieved from one or more other database servers. The second set of space usage data also reflects the amount of free space associated with the database. In an embodiment, the second set of space usage data is updated based on changes made to the database by the particular database server storing the second set of space usage data. The second set of space usage data may be retrieved using an update process located at the first database server.

Next, the first set of space usage data is updated at the first database server with the second set of space usage data. Thereafter, the first database server may evaluate the usage of space in the database based on the updated first set of space usage data. After the expiration of a configurable amount of time, a database server (which could be the first database server) may repeat the process of obtaining the second set of space usage data, updating a set of space usage data stored locally, and evaluating the usage of space in the database based on the updated set of space usage data.

Consequently, as the updated first set of space usage data reflects all the changes to the database since the last time the usage of space was determined for the database, the usage of space may be accurately determined for the database at the first database server without accessing with the database. Further, using embodiments of the invention, the efficiency of determining the usage of space in the database is enhanced because information about portions of the database that have not changed since the last time the usage of space was determined for the database need not be accessed to accurately determine the usage of space for the database.

Determining the Usage of Space in a Database

Figure 2:
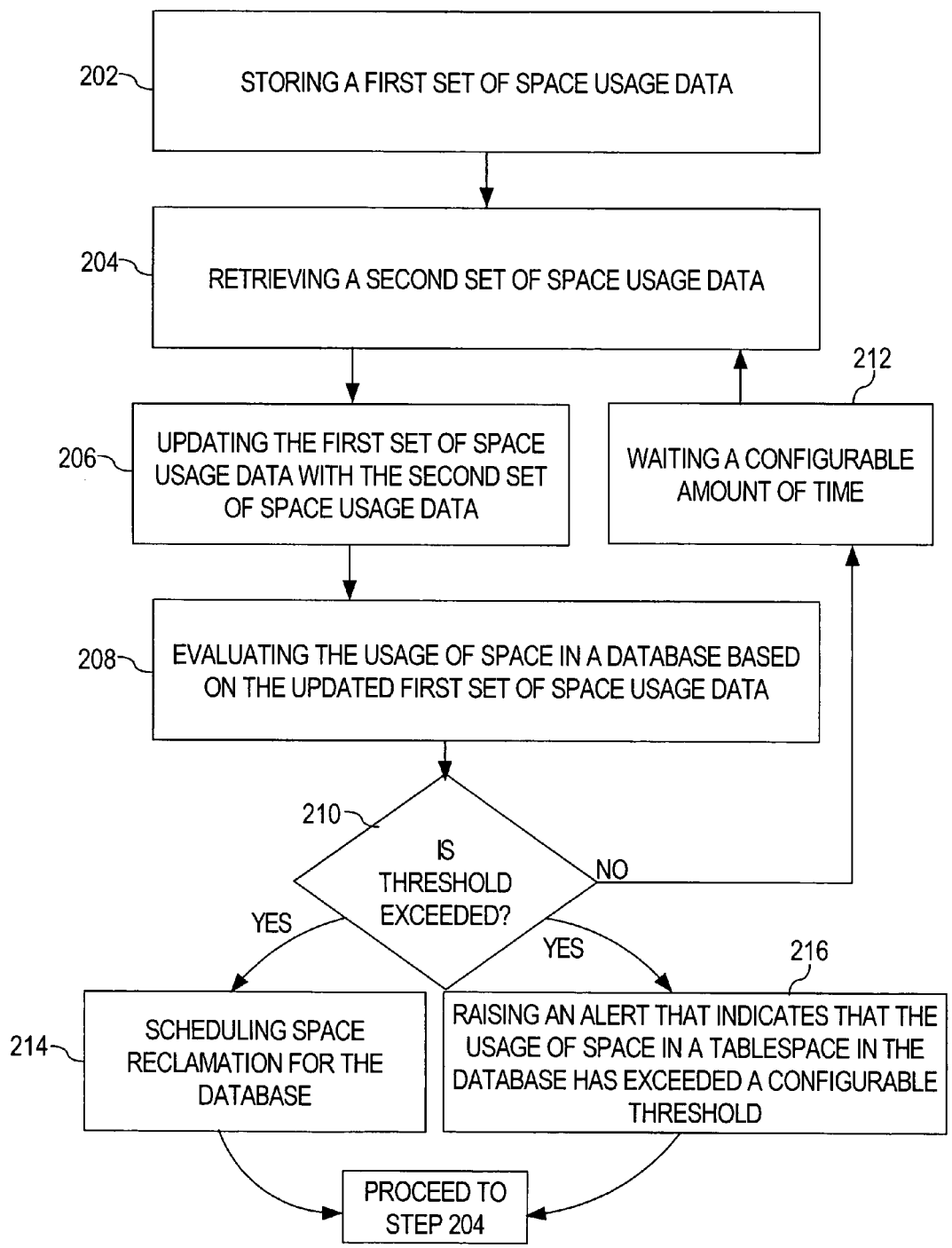
FIG. 2 is a flow chart illustrating the functional steps of determining the usage of space in a database according to an embodiment of the invention.

FIG. 2 is a flow chart illustrating the functional steps of determining the usage of space in a database according to an embodiment of the invention. According to an embodiment, each database server in the database management system 100 can perform the steps illustrated in FIG. 2; however, for ease of explanation, the functional steps illustrated in FIG. 2 shall be described from the perspective of a single database server performing the steps of FIG. 2.

In step 202, a first set of space usage data is stored at a database server. For example, database server 120A may perform step 202 by storing space usage data 122A. A database server may perform step 202 by storing the first set of space usage data in a non-persistent storage (such as volatile memory) or in a persistent storage (such as a file server or a database).

FIG. 3 is a pictorial representation of stored space usage data 302 at database server 304 according to an embodiment of the invention. FIG. 3 illustrates space usage data 302 that reflects the amount of free space in portions of a database, e.g., a data file or tablespace. Other embodiments may represent the amount of free space in other ways. For example, as the amount of free space may be calculated by comparing the size of a portion of a database with the amount of data currently stored in that portion, other embodiments may store the amount of used space of portions of a database if the size of those portions is readily ascertainable.

In an embodiment, the first set of space usage data may be obtained by contacting the database, and determining the usage of space of the database to the level of granularity specified in the space usage data by known techniques, e.g., consulting the first data block of each data file in each tablespace to determine the free space associated with that data file and aggregating the results. For example, as illustrated in FIG. 2, database server 120A may obtain space usage data 122A from database 110 by communicating with database 110 over communications link 130 using known techniques.

In an embodiment, the first set of space usage data stored in step 202 is continually updated based on changes made to the database by the database server storing the first set of space usage data. As FIG. 3 illustrates, after each transaction initiated by database server 304 against a database, space usage data 302 may be updated to reflect how much free space remains in the database after the transaction has been processed by the database. Each time a transaction allocates or deallocates a data block, the space usage data 302 may be updated. For example, if a transaction allocates one or more new data blocks in tablespace 1, data file 1, then the amount of free space remaining after that transaction has been processed will be recorded in space usage data 302, as shown in FIG. 3. In another example, if a transaction deallocates one or more data blocks in tablespace 2, data file 1, then the amount of free space remaining after that transaction has been processed will be recorded in space usage data 302 (not shown).

The amount of free space associated with a portion of the database remaining after the database server has processed a transaction may be determined by the database server examining, for example, the first data block in the data file associated with the transaction. Information about how much free space remains in each data file is maintained in the first data block of a data file. The information about how much free space remains in each data file is updated each time a transaction changes the amount of free space remaining in each data file.

Each row in the table storing space usage data 302 in FIG. 3 is associated with a system change number (hereinafter a SCN). A SCN is a number that is assigned by the database to each transaction the database processes. As the database assigns SCNs in an incremental fashion, older transactions will be assigned a lower SCN by the database than more recent transactions. The SCN associated with a portion of space usage data 302 corresponds to the SCN number of the transaction that last caused a change in the amount of free space to that portion of space usage data.

Space usage data 302 may record how much free space remains in the database after a transaction has been processed in multiple levels of granularity. For example, space usage data 302 illustrated in FIG. 3 records information about which tablespace was affected by each transaction, which data file was affected by each transaction, and how much free space remains in each data file. Other embodiments may record information at lower levels of granularity, e.g., embodiments of the invention may use space usage data 302 which records information about which data block in a particular data file was changed by a transaction, and how much free space is available in that data block. Other embodiments of the invention may record information at higher levels of granularity, e.g., embodiments of the invention may use space usage data 302 which only records information about which tablespace was affected by each transaction, and how much free space remains in each tablespace. Accordingly, embodiments of the invention are not limited to any level of granularity for recording information in space usage data.

In step 204, a database server retrieves a second set of space usage data from one or more other database servers. The second set of space usage data is updated at each database server to reflect how much free space is left within the database as a result of transactions performed on the database by database servers maintaining a portion of the second set of space usage data. Referring to FIG. 2, database server 120A may perform step 204 by retrieving space usage data 122B from database server 120B. In an embodiment, each database server in the database management system 100 performs step 204 by obtaining a second set of space usage data from each other database server in the database management system 100.

In an embodiment, the update process of a database server may retrieve the second set of space usage data from the one or more database servers in step 204. For example, update process 124A may perform step 204 by communicating with database server 120B over communications link 132 to retrieve space usage data 122B.

In step 206, the first set of space usage data is updated with the second set of space usage data. For example, update process 124A may update space usage data 122A with space usage data 122B retrieved in step 204. In an embodiment, each database server in the database management system 100 performs step 206.

In an embodiment, the second set of space usage data is merged with the first set of space usage data to generate an updated first set of space usage data. In order to facilitate the most up-to-date view of the usage of space, the updated first set of space usage data may only maintain an association of the highest (i.e., most recent) SCN that altered the usage of space in a data file for each data file. In other words, if a SCN ("the older SCN") is associated with a transaction that is older than another transaction that affected the usage of space within a data file, then that older SCN is not reflected in the updated first set of space usage data.

In step 208, the usage of space in a database is evaluated based on the first set of space usage data that was updated in step 206. In an embodiment, step 208 may be performed by database server 120A by evaluating the usage of space for database 110 based on space usage data 122A. In an embodiment, each database server in the database management system 100 performs step 208.

As shall be explained in further detail below, embodiments of the invention may repeatedly perform one or more steps illustrated in FIG. 2. In an embodiment, in performing step 208, only the portion of the space usage data which is at least as recent as the last time step 208 was performed need be analyzed. For example, assume at some time T that step 208 was performed, and that the free space associated with a tablespace was determined to be 100 MB. If step 208 is performed ten minutes later (at time T+ten minutes), then only entries in the space usage data that correspond to transactions against that tablespace that were recorded in the space usage data after time T need be considered, as only those entries after time T are not reflected in the current determination of the usage of space in that tablespace. In an embodiment, the SCN associated with each entry in the space usage data may be used to determine which entries in the space usage data have changed or have been updated since the last time step 208 was performed; only those entries that are associated with a SCN that is higher than the highest SCN previously processed need be considered in a current performance of step 208. After the performance of step 208, processing proceeds to step 210.

In step 210, a determination is made as to whether the free space of the database, or any portion thereof, exceeds one or more configurable thresholds. In an embodiment, database server 120A may perform step 210 by determining whether the free space of database 110, or any portion thereof (such as a tablespace), which was determined in step 208, exceeds a configurable threshold. A configurable threshold may be established for any level of granularity, e.g., a data block, a data file, a tablespace, or for the entire database. Each configurable threshold may be expressed in a variety of manners, e.g., the configurable threshold may be expressed as a percentage of total capacity or as a specified allotment of free space. Each configurable threshold may be established by an administrator of the database server or by the database server. In an embodiment wherein the database server establishes the configurable threshold, the database server may determine a configurable threshold using a variety of factors, including, the total capacity of the database, the type of information stored in the database, the anticipated growth rate of database, or a threshold of another database in a cluster or grid.

If the determination of step 210 is negative (no configurable thresholds are exceeded), then processing proceeds to step 212. In step 212, the database server waits for a configurable period of time. The configurable period of time indicates an amount of time to wait before proceeding to step 204. In an embodiment, the configurable amount of time in step 212 is ten minutes. After the database server detects that the configurable amount of time to wait has transpired, then processing proceeds to step 204. Each time step 212 is performed, a different database server in the database management system 100 may perform step 204. For example, the first time step 204 is performed, database server 120A may perform the step, the second time step 204 is performed, database server 120B may perform the step, etc. Accordingly, the usage of space for the database may be continuously monitored without a single database server in the database management system 100 polling the usage of space in the database after the performance of step 202.

In an embodiment, if the determination of step 210 is positive (a configurable threshold is exceeded), then, in an embodiment, processing proceeds to step 214. In step 214, space reclamation is scheduled for the database. In an embodiment, step 214 may be performed by database server 120A by scheduling space reclamation for database 110.

In another embodiment, if the determination of step 210 is positive (a configurable threshold is exceeded), then, in an embodiment, processing proceeds to step 216. In step 216, an alert is raised that indicates to the database administrator that the usage of space in a tablespace in the database has exceeded a configurable threshold. In an embodiment, step 216 may be performed by database server 120A raising an alert to a database administrator that indicates that the usage of space in a tablespace in database 110 has exceeded a configurable threshold.

Embodiments of the invention may perform the sequence of steps in various order, e.g., embodiments may perform one or more steps in a different order than depicted in FIG. 2 or may perform one or more steps depicted in FIG. 2 in parallel. For example, embodiments of the invention may perform both step 212 and step 214, either in parallel or in sequence. Consequently, the sequence of steps illustrated in FIG. 2 is merely illustrative; embodiments of the invention are not limited to the particular sequence of steps illustrated in FIG. 2.

According to embodiments of the invention, any number of database servers in database management system 100 may perform the sequence of steps illustrated in FIG. 2. Specifically, each of the database servers may perform each of the steps of FIG. 2, and wherein a particular database server in the database management system 100 performs step 204, then that particular database server retrieves a second set of space usage data from each of the other database servers within database management system 100.

When a particular database servers in the database management system 100 crashes, the space usage data stored at each database server in the database management system 100 may need to be reinitialized after the crashed database server becomes operational to reflect the activities of the crashed database server contemporaneous of when the database server became inoperable. The space usage data may be reinitialized by performing the steps of FIG. 2 at each database server in the database management system 100.

As the updated first set of space usage data 122A obtained in step 206 reflects all the changes to database 110 since the last time the usage of space was determined for database 110, after the initial performance of step 202, the usage of space may be accurately determined by database server 120A for database 110 without polling database 110 to determine the usage of space. Further, using embodiments of the invention, information about portions of database 110 that have not changed since the last time the usage of space was determined for database 100 need not be consulted to accurately determine the usage of space for database 100. These benefits advantageously save time and computing resources of both database server 120A and database management system 100.

Hardware Overview

Figure 4:
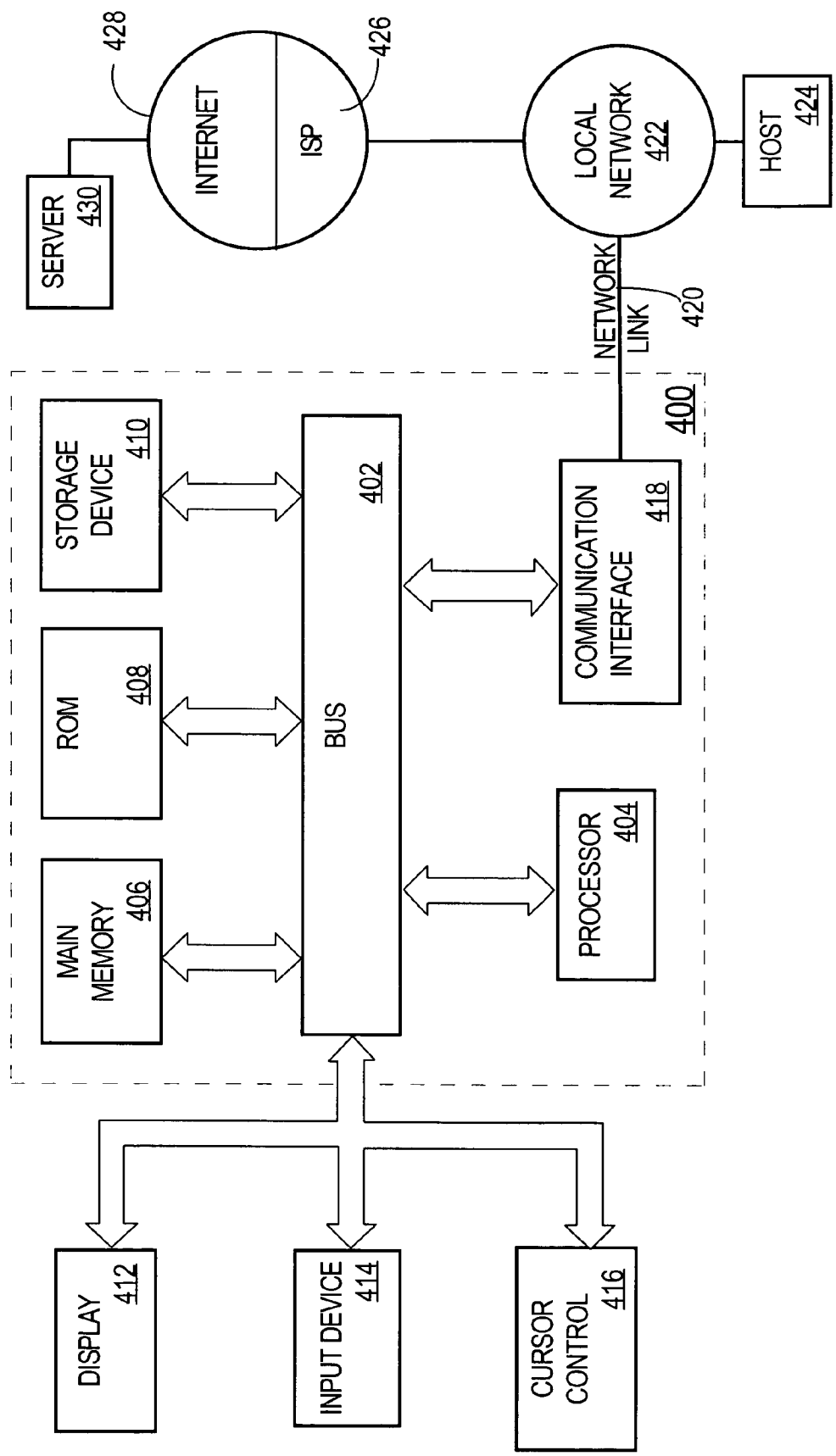
FIG. 4 is a block diagram that illustrates a computer system upon which an embodiment of the invention may be implemented.

FIG. 4 is a block diagram that illustrates a computer system 400 upon which an embodiment of the invention may be implemented. Computer system 400 includes a bus 402 or other communication mechanism for communicating information, and a processor 404 coupled with bus 402 for processing information. Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions to be executed by processor 404. Computer system 400 further includes a read only memory (ROM) 408 or other static storage device coupled to bus 402 for storing static information and instructions for processor 404. A storage device 410, such as a magnetic disk or optical disk, is provided and coupled to bus 402 for storing information and instructions.

Computer system 400 may be coupled via bus 402 to a display 412, such as a cathode ray tube (CRT), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

The invention is related to the use of computer system 400 for implementing the techniques described herein. According to one embodiment of the invention, those techniques are performed by computer system 400 in response to processor 404 executing one or more sequences of one or more instructions contained in main memory 406. Such instructions may be read into main memory 406 from another computer-readable medium, such as storage device 410. Execution of the sequences of instructions contained in main memory 406 causes processor 404 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 404 for execution. Such a medium may take many forms, including but not limited to, non-volatile media, volatile media, and transmission media. Non-volatile media includes, for example, optical or magnetic disks, such as storage device 410. Volatile media includes dynamic memory, such as main memory 406. Transmission media includes coaxial cables, copper wire and fiber optics, including the wires that comprise bus 402. Transmission media can also take the form of acoustic or light waves, such as those generated during radio-wave and infra-red data communications.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 404 for execution. For example, the instructions may initially be carried on a magnetic disk of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world wide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are exemplary forms of carrier waves transporting the information.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418.

The received code may be executed by processor 404 as it is received, and/or stored in storage device 410, or other non-volatile storage for later execution. In this manner, computer system 400 may obtain application code in the form of a carrier wave.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method for determining the usage of space in a database, comprising:

storing, by a first database server, a first set of space usage data that identifies a first amount of free space remaining in a database for storing additional database data;

said first database server making multiple sets of changes to said database, wherein in response to making each set of changes of said multiple sets of changes, updating said first set of space usage data;

retrieving, from one or more second database servers, a second set of space usage data, that identifies a second amount of free space associated with the database;

wherein the first set of space usage data is separate and distinct from the second set of space usage data;

while said first database server is making multiple sets of changes, said second database server making multiple sets of changes to said database, wherein in response to making each set of changes of said multiple sets of changes, updating said second set of space usage data;

updating the first set of space usage data with the second set of space usage data; and evaluating the usage of space in the database based on the updated first set of space usage data, wherein the method is performed by one or more computing devices.

2. The method of claim 1, wherein the first set of space usage data and the second set of space usage data each reflect the amount of free space in one or more tablespaces that are each associated with the database.

3. The method of claim 1, wherein the first set of space usage data and the second set of space usage data each reflect the amount of free space in one or more files that are each associated with the database.

4. The method of claim 1, wherein the step of storing the first set of space usage data comprises:

storing subsets of the first set of space usage data, wherein each subset of said subsets is associated with a transaction initiated by the first database server that is performed on the database.

5. The method of claim 1, wherein the step of storing the first set of space usage data comprises:
examining the database to generate the first set of space usage data.

6. The method of claim 1, wherein the step of retrieving the second set of space usage data comprises:
determining that a configurable period of time has expired, wherein the configurable period of time indicates an amount of time to wait before retrieving the second set of space usage data from the one or more second database servers.

7. The method of claim 1, wherein the step of evaluating the usage of space in the database comprises:
determining if a tablespace in the database has exceeded a configurable threshold.

8. The method of claim 1, further comprising:
raising an alert that indicates that the usage of space in a tablespace in the database has exceeded a configurable threshold.

9. The method of claim 1, further comprising:
in response to the step of evaluating the usage of space in the database, scheduling space reclamation for the database.

10. The method of claim 1, wherein the database is in a distributed cluster of databases.

11. The method of claim 1, wherein the database is in a grid of databases.

12. The method of claim 1, wherein the steps of retrieving, updating, and evaluating may be repeated in sequence after a configurable amount of time lapses since the step of evaluating was last performed.

13. A non-transitory computer-readable storage medium storing one or more sequences of instructions for determining the usage of space in a database, wherein execution of the one or more sequences of instructions by one or more processors causes the one or more processors to perform the steps of:
storing, by a first database server, a first set of space usage data that identifies a first amount of free space remaining in a database for storing additional database data;
said database server making multiple sets of changes to said database, wherein in response to making each set of changes of said multiple sets of changes, updating said first set of space usage data;
retrieving, from one or more second database servers, a second set of space usage data, that identifies a second amount of free space associated with the database;
wherein the first set of space usage data is separate and distinct from the second set of space usage data;
while said first database server is making multiple sets of changes, said second database server making multiple sets of changes to said database, wherein in response to making each set of changes of said multiple sets of changes, updating said second set of space usage data;
updating the first set of space usage data with the second set of space usage data; and
evaluating the usage of space in the database based on the updated first set of space usage data.

14. The non-transitory computer-readable storage medium of claim 13, wherein the first set of space usage data and the second set of space usage data each reflect the amount of free space in one or more tablespaces that are each associated with the database.

15. The non-transitory computer-readable storage medium of claim 13, wherein the first set of space usage data and the second set of space usage data each reflect the amount of free space in one or more files that are each associated with the database.

16. The non-transitory computer-readable storage medium of claim 13, wherein the step of storing the first set of space usage data comprises:
storing subsets of the first set of space usage data, wherein each subset of said subsets is associated with a transaction initiated by the first database server that is performed on the database.

17. The non-transitory computer-readable storage medium of claim 13, wherein the step of storing the first set of space usage data comprises:
examining the database to generate the first set of space usage data.

18. The non-transitory computer-readable storage medium of claim 13, wherein the step of retrieving the second set of space usage data comprises:
determining that a configurable period of time has expired, wherein the configurable period of time indicates an amount of time to wait before retrieving the second set of space usage data from the one or more second database servers.

19. The non-transitory computer-readable storage medium of claim 13, wherein the step of evaluating the usage of space in the database comprises:
determining if a tablespace in the database has exceeded a configurable threshold.

20. The non-transitory computer-readable storage medium of claim 13, wherein execution of the one or more sequences of instructions by the one or more processors causes the one or more processors to perform the additional step of:
raising an alert that indicates that the usage of space in a tablespace in the database has exceeded a configurable threshold.

21. The non-transitory computer-readable storage medium of claim 13, wherein execution of the one or more sequences of instructions by the one or more processors causes the one or more processors to perform the additional step of:
in response to the step of evaluating the usage of space in the database, scheduling space reclamation for the database.

22. The non-transitory computer-readable storage medium of claim 13, wherein the database is in a distributed cluster of databases.

23. The non-transitory computer-readable storage medium of claim 13, wherein the database is in a grid of databases.

24. The non-transitory computer-readable storage medium of claim 13, wherein the steps of retrieving, updating, and evaluating may be repeated in sequence after a configurable amount of time lapses since the step of evaluating was last performed.

* * * * *